(12) United States Patent
Norton et al.

(10) Patent No.: US 10,133,655 B1
(45) Date of Patent: Nov. 20, 2018

(54) EMULATION OF TARGET SYSTEM USING JIT COMPILER AND BYPASSING TRANSLATION OF SELECTED TARGET CODE BLOCKS

(71) Applicant: Sony Interactive Entertainment Inc., Tokyo (JP)

(72) Inventors: Geoffrey Piers Robert Norton, Foster City, CA (US); Jacob P. Stine, La Honda, CA (US); Takayuki Kazama, Castro Valley, CA (US); Dmitri Tolstov, San Carlos, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/620,751

(22) Filed: Jun. 12, 2017

(51) Int. Cl.
*G06F 9/45* (2006.01)
*G06F 11/36* (2006.01)

(52) U.S. Cl.
CPC ...... *G06F 11/3652* (2013.01); *G06F 11/3624* (2013.01)

(58) Field of Classification Search
None
See application file for complete search history.

(56) References Cited

U.S. PATENT DOCUMENTS

2003/0093776 A1* 5/2003 Hilton ................ G06F 9/45504 717/138

OTHER PUBLICATIONS

International Search Report and Written Opinion dated Jun. 6, 2018 for International Patent Application No. PCT/US2018/036196.

* cited by examiner

*Primary Examiner* — Chuck Kendall
(74) *Attorney, Agent, or Firm* — JDI Patent; Joshua D. Isenberg; Robert Pulllman (57) ABSTRACT

An emulator handles problematic target code blocks by evaluating target system code for problematic target code blocks and bypassing translation of such blocks, in some cases selecting alternative host code for a problematic block. Non-problematic portions of the target system code are translated into corresponding portions of host system code, which are inserted into an execution stream. Alternative host system code may also be inserted into the execution stream.

39 Claims, 4 Drawing Sheets

EMULATION OF TARGET SYSTEM USING JIT COMPILER AND BYPASSING TRANSLATION OF SELECTED TARGET CODE BLOCKS

FIELD OF INVENTION

The current disclosure relates to software compilers. More specifically the current disclosure relates to translation of code written to run on one device architecture to run on a second different device architecture.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. Emulation has also been realized through the creation of "virtual machines," in which the target platform's physical architecture—the design of the hardware itself—is replicated via a virtual model in software.

Two main types of emulation strategies currently are commonly used. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of a program in the target machine language into a set of instructions in the host machine language, where the host machine language is the code language of the host computer used to emulate the target machine. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. Due to the well-known slowness of software emulation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Some runtime translation systems use a method known as Just-In-Time (JIT) translation or compilation to translate target software into host software on an as-needed basis. Examples emulation employing JIT translation schemes are described, e.g., in U.S. Pat. Nos. 8,245,202 B2, 7,792,666 B2, 7,813,909 B2 and 7,770,050 B2, which have been incorporated by reference above. Such a runtime JIT scheme is often used in translating target software of a dynamic nature. In software that is dynamic in nature, portions of code may change dynamically prior to execution. For example, within the target system, executable code may change dynamically through the loading of new executables, loading of overlays, runtime code generation or self-modifying code. Dynamic code changes may also occur by modifying memory through a number of pathways such as by executing system calls, via direct memory access (DMA) transfers from various devices, or simply by executing user code.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

INTRODUCTION

Translating code written for a target system to run on a host system may run in to difficulty due differences between the configuration of the target system and the host system. These differences result in coding blocks that may be incompatible when directly translated from the code written for the target system to code compatible with the host system. These pieces of code also known as problematic target code (PTC) blocks may also be unnecessary code sections that were never removed during quality checking of the original target system code. PTC blocks may cause the translated code to fail to run or to run poorly on the host system. As used herein, the terms problematic target code block or PTC block refers to a non-branching sequence of one or more. Examples of PTC blocks include code blocks that were written for debugging the target system code for an application, or poorly written or broken target code sequences that were not repaired during the quality assurance process for the target system code for an application.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
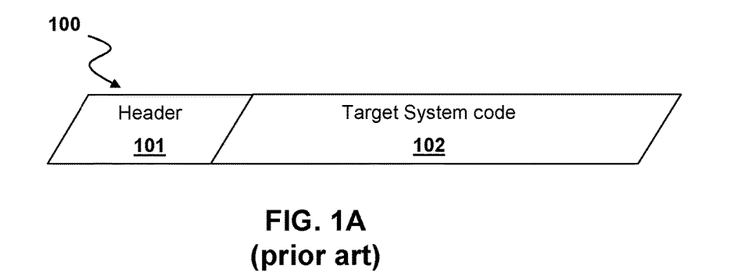
FIG. 1A is a block diagram of prior art target system code.
Figure 1B:
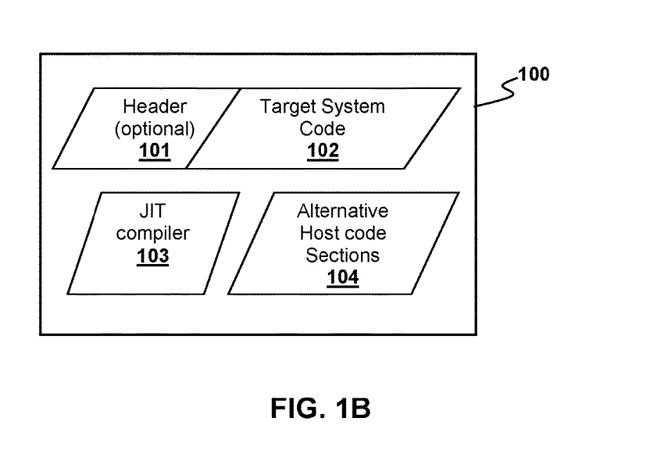
FIG. 1B is a block diagram of a non-transitory computer readable memory containing target system code and a JIT compiler according to aspects of the current disclosure.

FIG. 1A depicts an example of a prior art target system program embedded in a non-transitory computer-readable medium such as RAM, ROM, CD-ROM, DVD-ROM, Blu- Ray, Flash memory, floppy diskette, Hard Disk, Magnetic tape and the like. The target system program may include a header 101 that informs the target system of information such as File names, file sizes, file types, compatibility information and file continuity hash codes. The prior art target system program also includes target system code 102. The target system code 102 may be a program written to run on a legacy system (i.e., an earlier version of the host system) or a computer system not compatible with the host system. The target system code 102 may be in a low level programming languages such as Machine code, Assembly, or in a mixed level programming languages such as C, C++, C# or high level languages such as PERL or Visual Basic, and the like. FIG. 1B depicts an example of a non-transitory computer-readable medium 100 according to certain aspects of the present disclosure. In this non-limiting example, a target system program is embedded with an emulation program including a JIT compiler. As in the prior art case the target program may include the aforementioned header 101 and target system code 102. In this particular example the non-transitory computer-readable medium 100 includes a JIT compiler 103 configured to translate the target system code 102 into host system code, as discussed in further detail below. The non-transitory computer-readable medium 100 may also include a database of alternative host code sections 104 that the JIT compiler 103 can use to implement problematic target code block handling instructions as will be discussed in the next section. The JIT compiler 103 and the database of alternative host code sections 104 may be located in memory or logic on the host system or embedded in the same non-transitory medium of the target system code 102, however aspects of the present disclosure are not limited to such implementations. In alternative implementations the target system code 102, JIT compiler 103, and alternative host code sections 104 may be stored in separate computer-readable media that are all accessible by a host system, e.g., over a network.

Figure 2:
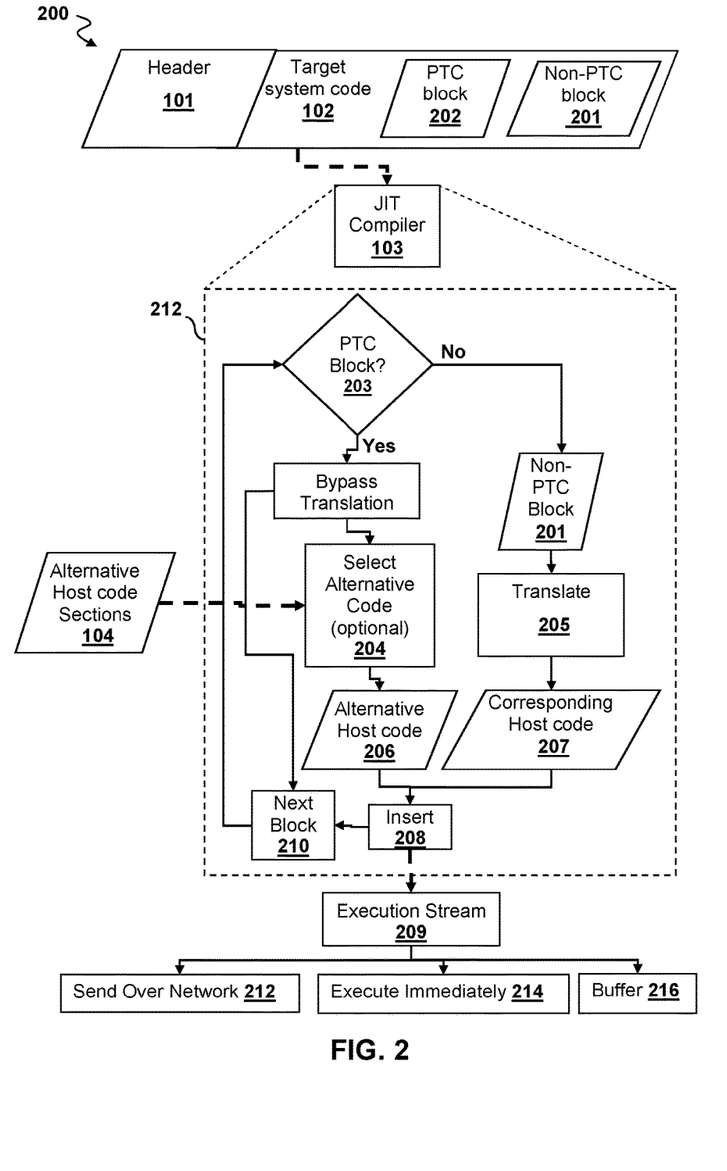
FIG. 2 is a flow diagram depicting the process selecting and inserting alternate host code according to aspects of the current disclosure.

FIG. 2 depicts a method for handling problematic target system code according to aspects of the present disclosure. In FIG. 2 dotted arrows are meant to indicate flow of data and solid arrows are meant to indicate flow of computational operations.

According to one aspect of the present disclosure the host system may carry out a method to emulate target code with PTC block on a host system 200. Likewise the emulation method 200 may be carried out remotely and sent over a network to the host system. For ease of description the method will be described as being carried out on the host system herein. To start the host system may initiate a program written for a target system 102. Upon selection of the target code system the header 101 may inform the host system that the code 102 is written for a target system. The target system code 102 may have both non-problematic target code blocks 201 and problematic test code blocks 202. The host system will invoke a JIT Complier 103 which will carry out the process 212. Initially, the JIT compiler evaluates the code for the presence of PTC blocks, as indicated at 203. If the JIT compiler decides at 203 that the block is a Non-PTC block 201 then the Non-PTC blocks 201 are translated 205 into corresponding host system code 207, and inserted into a host system execution stream, as indicated at 208.

The JIT compiler 103 may employ numerous techniques to evaluate whether a block of target code is a PTC block at 202. Foremost the JIT compiler 103 may evaluate the code for suboptimal performance. The JIT compiler 103 may detect redundancy in the target code. The JIT compiler 103 may also detect lines of code that are referenced multiple times throughout the program and monitor the time it takes to execute the referenced code. Additionally the JIT compiler 103 may detect code written for specific components of the target system for instance, the vector units in a Reduced Instruction Set Computing (RISC) instruction set architecture, such as the MIPS architecture, or the Synergistic processing Units (SPU) of the Cell Broadband architecture. Other detection methods may include detecting whether the target code 102 was programmed to take advantage of larger registers on the target system than on the host system. In other implementations, PTC blocks 202 may be identified during a testing phase in which the target system code is translated normally into host system code and performance of the resulting code is monitored. If the translated code runs poorly or doesn't run at all the corresponding portions of target system code may be analyzed to determine patterns causing the underlying problem and to generate alternative host system code. The JIT compiler 103 can then be configured, e.g., programmed, to recognize these patterns at runtime. To recognize these PTC blocks efficiently the JIT 103 compiler may be configured to identify the start of an address block and generate hash values for each block of target system code 102. The JIT compiler 103 may be configured to recognize the hash value of PTC blocks 202 associated with the Alternative host code sections 104.

During a testing phase, a developer may identify problematic code blocks by analyzing performance of the translated code. For example, the developer may check a performance counter (e.g. a performance analyzer) or an address hit counter (to determine how many times a block has been executed) or by manually determining which code block 'runs poorly'. Such analysis may be automated to determine which target code blocks would be more advantageously emulated using 'the alternative host code'.

In some implementations it may be possible for the JIT compiler 103 to "learn" which code blocks are problematic on the fly, e.g., by simulating execution of translated target code blocks, and detecting an error and identifying the nature of the problem from the error. By way example, and not by way of limitation, the JIT compiler 103 or host system may be configured, e.g., through appropriate programming and/or hardware configuration, to detect a specific sequence of memory accesses in the target code that qualify as PTC. Such patterns may yield an optimal solution to a specific programming problem on the target hardware, but cause problems, e.g., a system memory stall when faithfully executed on host hardware. One example of such a pattern is referred to within the industry as a Store-to-Load Forward (STLF). By instrumentation to track memory read/write patterns and filter the likely STLF candidates the process of tracking memory access may be done at runtime, but could also be done via JIT simulation. Collected data can be used to target specific blocks for PTC replacement.

In other implementations, the JIT compiler 103 or host system may use an industry standard process for detected problems/errors in compiled blocks. One example of such a standard process is called "Instrumentation" Although not a learning mechanism, Instrumentation provides large amounts of data about code execution patterns, which can then be filtered for relevancy. Some implementations may use a combination of learning problematic code blocks on the fly and analyzing execution patterns, e.g., with Instrumentation.

The JIT compiler 103 bypasses normal translation of PTC blocks 202. According to aspects of the present disclosure, as indicated at 204 upon detection of a PTC block 202 the JIT compiler 103 may bypass translation of the PTC block by selecting an appropriate piece of alternate host code 206 from a database of alternative host code sections 104 to replace the PTC block 204. The alternative host system code 206 may include pre-written sections of code stored in memory. The alternative host system code 206 may include either branching or non-branching instructions written to run on the host system. The alternative code 206 may implement a variety of different solutions to repair the PTC blocks 202. For example the alternative host code 206 may remap the register values to account for smaller registers (or a smaller number of registers) on the host system than on the target system. Another example is that the alternative host code 206 may eliminate lane masking code instructions or implement additional steps to accomplish lane masking on the host system. Alternatively the alternative host code 206 may be implemented to streamline or more efficiently run the translated target system 207 code on the host system.

One significant advantage of the method described herein is that emulation can be configured to 'eliminate unnecessary code entirely. As noted above, some applications contain unused debug code on the product that isn't necessary, except for development. Such code can cause decrease performance and is usually completely unnecessary. Aspects of the present disclosure allow an emulation system to modify or skip such code through bypassing of problematic code blocks and, where appropriate, injection of alternative host code. Although such unnecessary code can be skipped using a 'Hook/Replacement' patch, emulation may run much faster with bypass of problematic code blocks and appropriate injection of alternative host code.

In some cases, the JIT compiler 103 may simply skip translation of certain PTC blocks without inserting any alternative host system code into the execution stream. For example, certain PTC blocks such as leftover de-bug code might have no effect on operation of the target code but could detrimentally affect execution of the host system if they are translated. The JIT compiler may bypass translation of such PTC blocks without inserting any alternative host system code into the execution stream 209.

The JIT compiler 103 may be configured to insert 208 the alternative host code 206 in the same location in execution stream 209 as a translated PTC block would have been placed. Alternatively the JIT compiler 103 may place the alternate host code at a different location in the execution stream 209. In some implementations, the JIT compiler 103 translate a PTC block and insert alternative host code into the execution stream along with the translated PTC block or the JIT compiler 103 may alter the translation of the PTC block slightly with alternate host code and insert the altered PTC block in to the execution stream.

In an alternative implementation the JIT compiler 103 may scan the target system code for known PTC blocks before translation 203. Upon detection of a PTC block the JIT compiler may initiate a handling process 212. The JIT compiler 103 during the handling process selects 204 alternative host code 206 from the database of alternative host code section 104 to replace or repair the detected PTC block 202. The JIT compiler 103 may then insert 208 alternative host code 206 in to the execution stream 209 at the appropriate time. Alternatively the JIT compiler may choose to translate the PTC block and insert 208 alternate host code in an appropriate location in the execution stream 209. In some implementations the JIT compiler 103 may simply not insert 208 alternative host code 206 for PTC blocks into the execution stream at 206, e.g., for PTC blocks known to be unnecessary. It is desirable that the JIT compiler 103 be able to choose between alternative actions depending on the type problem caused by the PTC block 202.

Once the JIT compiler 103 has resolved the PTC block 202, it will resume translating the non-PTC blocks 201 into corresponding host system code 207 and inserting 208 the corresponding host system code 207 in to the execution stream at 209. During translation the JIT compiler 103 may monitor execution 209 of the translated code to determine whether performance is suboptimal. Upon such a determination of suboptimal performance the JIT compiler may reinitiate detection and handling of PTC blocks. In an alternate embodiment the alternate host code 206 is inserted 208 after the Non-PTC blocks 201 have been translated 205. After translation has been bypassed (e.g., after inserting alternative host code into the execution stream) or corresponding host code 207 has been inserted into the execution stream 209 the process 212 may be repeated on the next block of target code 102, as indicated at 210.

The execution stream 209 may be sent over a network to the host computer, as indicated at 212. Alternatively the instructions in the execution stream 207 may be executed by a processor on the host system immediately, as indicated at 214, or fill a buffer or cache on the host system for eventual execution, as indicated at 216.

Figure 3:
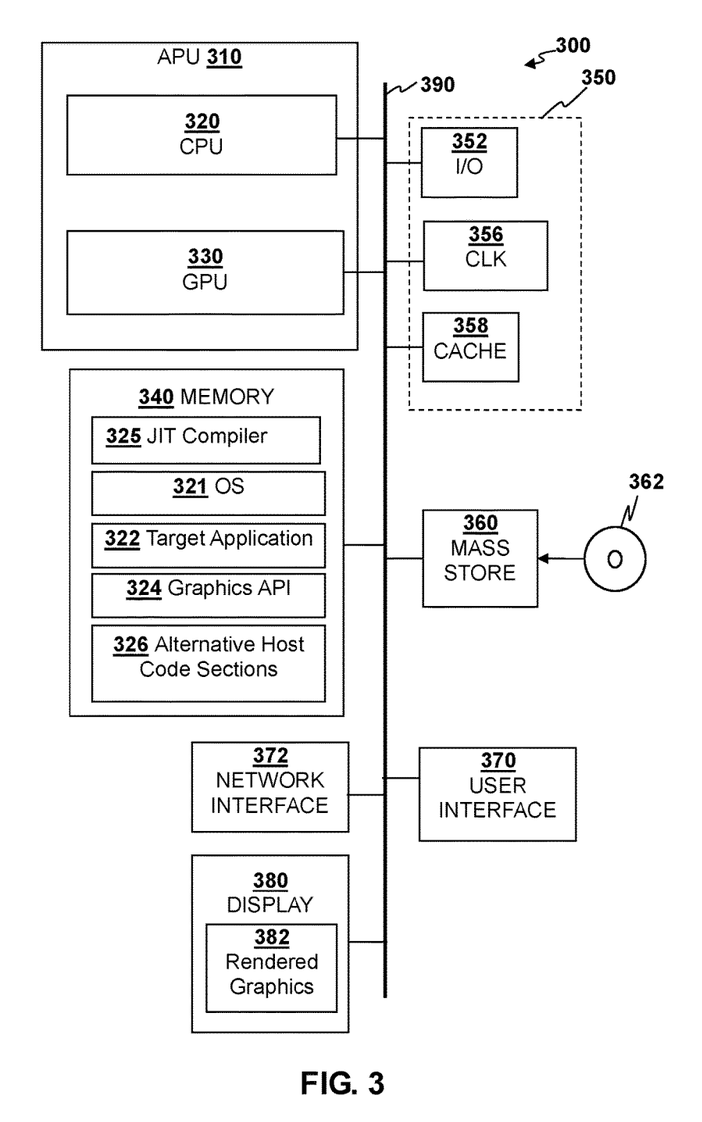
FIG. 3 depicts a hardware configuration of a host system according to aspects of the current disclosure.
Figure 4:
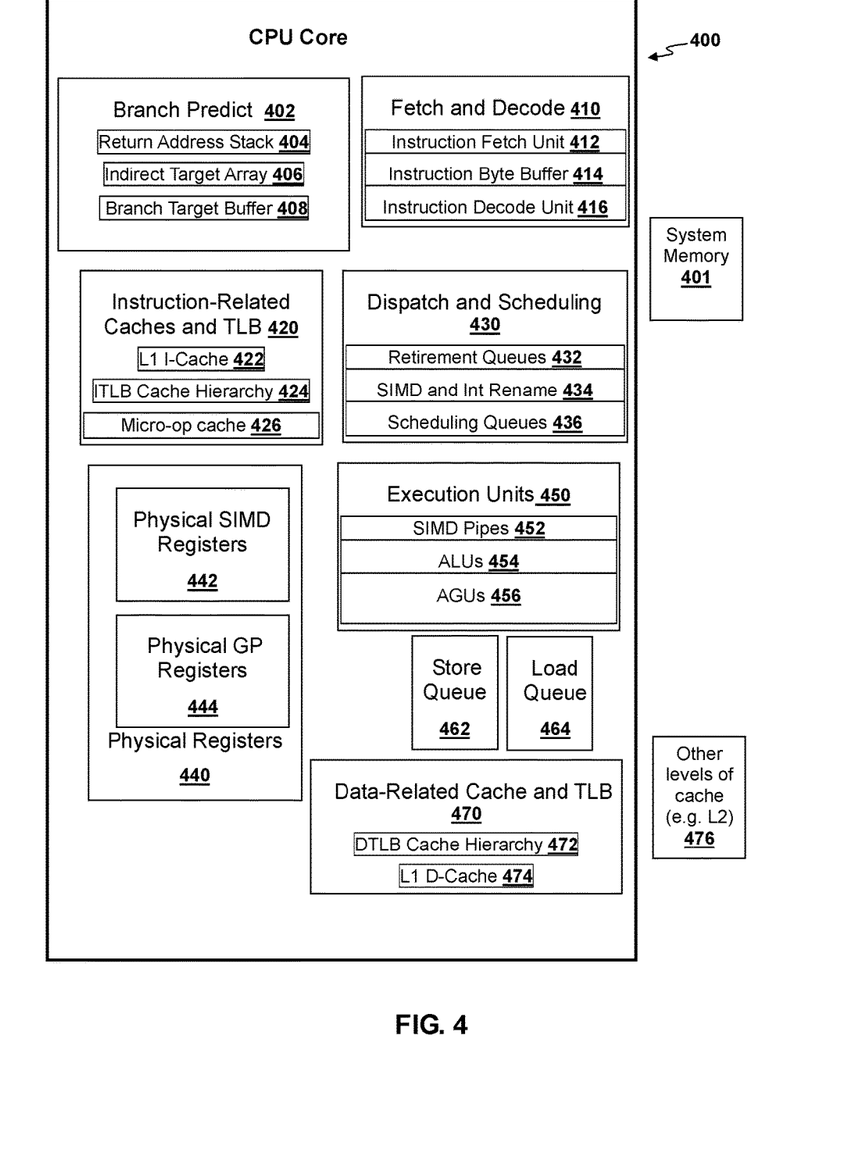
FIG. 4 depicts CPU core architecture of a host system according to aspects of the current disclosure.

Turning now to FIG. 3, an illustrative example of a host system 300 configured to operate with the host CPU of FIG. 4 in accordance with aspects of the present disclosure is depicted. According to aspects of the present disclosure, the system 300 may be an embedded system, mobile phone, personal computer, tablet computer, portable game device, workstation, game console, and the like.

The system 300 generally includes a central processor unit (CPU) 320 which may include a CPU core 400 and other features of the type depicted in FIG. 4 and discussed above. By way of example and not by way of limitation, the CPU 320 may be part of an accelerated processing unit (APU) 310 that includes the CPU 320, and a graphics processing unit (GPU) 330 on a single chip. In alternative implementations, the CPU 320 and GPU 330 may be implemented as separate hardware components on separate chips.

The system 300 may also include memory 340. The memory 340 may optionally include a main memory unit that is accessible to the CPU 320 and GPU 330. The CPU 320 and GPU 330 may each include one or more processor cores, e.g., a single core, two cores, four cores, eight cores, or more. The CPU 320 and GPU 330 may be configured to access one or more memory units using a data bus 390, and, in some implementations, it may be useful for the system 300 to include two or more different buses.

The memory 340 may include one or more memory units in the form of integrated circuits that provides addressable memory, e.g., RAM, DRAM, and the like. The memory may contain executable instructions for a JIT compiler 325 configured to implement the method of FIG. 2 and alternative host code sections 326. In addition, the memory 340 may include a dedicated graphics memory for temporarily storing graphics resources, graphics buffers, and other graphics data for a graphics rendering pipeline.

The CPU 320 may be configured to execute CPU code, which may include operating system (OS) 321 or one or more target applications 322 (e.g., a video game). According to aspects of the present disclosure the CPU may also be configured to execute CPU code for a JIT compiler 325 which may use as a resource a database of alternative host code sections 326. The OS 321 may be configured to implement certain features of operating the CPU 320. The CPU code may include a graphics application programming interface (API) 324 for issuing draw commands or draw calls to programs implemented by the GPU 330 based on a state of the application 322. The CPU code may also implement physics simulations and other functions. Portions of the code for one or more of the OS 321, target applications 322, JIT compiler 325, Alternative host code sections 326, or API 324 may be stored in the memory 340, caches internal or external to the CPU or in a mass storage device accessible to the CPU 320.

The system 300 may also include well-known support functions 350, which may communicate with other components of the system, e.g., via the bus 390. Such support functions may include, but are not limited to, input/output (I/O) elements 352, one or more clocks 356, which may include separate clocks for the CPU and GPU, respectively, and one or more levels of cache 358, which may be external to the CPU 320. The system 300 may optionally include a mass storage device 360 such as a disk drive, CD-ROM drive, flash memory, tape drive, Blu-ray drive, or the like to store programs and/or data. In one example, the mass storage device 360 may receive a computer readable medium 362 containing an application originally designed to run on a target system. Alternatively, the target system application 362 (or portions thereof) may be stored in memory 340 or partly in the cache 358.

The device 300 may also include a display unit 380 to present rendered graphics 382 prepared by the GPU 330 to a user. The device 300 may also include a user interface unit 370 to facilitate interaction between the system 300 and a user. The display unit 380 may be in the form of a flat panel display, cathode ray tube (CRT) screen, touch screen, head mounted display (HMD) or other device that can display text, numerals, graphical symbols, or images. The display 380 may display rendered graphics 382 processed in accordance with various techniques described herein. The user interface 370 may contain one or more peripherals, such as a keyboard, mouse, joystick, light pen, game controller, touch screen, and/or other device that may be used in conjunction with a graphical user interface (GUI). In certain implementations, the state of the target application 322 and the underlying content of the graphics may be determined at least in part by user input through the user interface 370, e.g., where the target application 322 includes a video game or other graphics intensive application.

The system 300 may also include a network interface 372 to enable the device to communicate with other devices over a network. The network may be, e.g., a local area network (LAN), a wide area network such as the internet, a personal area network, such as a Bluetooth network or other type of network. The network interface 372 may also enabled to receive corresponding host code over the network from an emulator running according to aspects of the current disclosure on a server. Various ones of the components shown and described may be implemented in hardware, software, or firmware, or some combination of two or more of these.

FIG. 4 depicts a generalized architecture of a Host system CPU core 400. The CPU core 400 typically includes a branch prediction unit 402, that attempts to predict whether a branch will be taken or not, and also attempts (in the event that the branch is taken) to predict the destination address of the branch. To the extent that these predictions are correct the efficiency of speculatively executed code will be increased; highly accurate branch prediction is therefore extremely desirable. The branch prediction unit 402 may include highly specialized sub-units such as a return address stack 404 that tracks return addresses from subroutines, an indirect target array 406 that tracks the destinations of indirect branches, and a branch target buffer 408 and its associated prediction logic that track past history of branches in order to more accurately predict their resulting addresses.

The Host system CPU core 400 typically includes an instruction fetch and decode unit 410, which includes an instruction fetch unit 412, an instruction byte buffer 414, and an instruction decode unit 416. The CPU core 400 also typically includes a number of instruction related caches and instruction translation lookaside buffers (ITLBs) 420. These may include an ITLB cache hierarchy 424 that caches virtual address to physical address translation information such as page table entries, page directory entries, and the like. This information is used to transform the virtual address of the instruction into a physical address so that the instruction fetch unit 412 can load the instructions from the cache hierarchy. By way of example, and not by way of limitation, the program instructions may be cached according to a cache hierarchy that includes a level 1 instruction cache (L1 I-Cache) 422 residing in the core, as well as other cache levels 476 external to the CPU core 400; using the physical address of the instruction, these caches are first searched for the program instructions. According to aspects of the current disclosure the target application 322 may be written for a CPU core with a different number of instruction caches than the instruction caches 422 on the Host CPU core 400 or different-size instruction caches than those on the Host CPU core. If the instructions are not found, then they are loaded from a system memory 401. Depending on the architecture, there may also be a micro-op cache 426 that contains the decoded instructions, as described below. In some implementations, the JIT compiler 325 may detect problematic target code blocks that write to or read from target system instruction caches and utilize alternative host system code rather than translate such problematic blocks.

The target system code may be written for a system that uses a different instruction set than the host system. The JIT compiler 325 may translate the target system code to use an instruction set that is compatible with the Host CPU Core 400 or replace problematic target code blocks with alternative host system code.

Once the program instructions have been fetched, they are typically placed in the instruction byte buffer 414 awaiting processing by the instruction fetch and decode unit 410. Decoding can be a very complex process; it is difficult to decode multiple instructions each cycle, and there may be restrictions on instruction alignment or type of instruction that limit how many instructions may be decoded in a cycle. Decoded instructions may, depending on architecture, be placed in the micro-op cache 426 (if one is present on the new CPU) so that the decode stage can be bypassed for subsequent use of the program instructions.

Decoded instructions are typically passed to other units for dispatch and scheduling 430. These units may use retirement queues 432 to track the status of the instructions throughout the remainder of the CPU pipeline. Also, due to the limited number of general purpose and SIMD registers available on many CPU architectures, register renaming may be performed, in which as logical (also known as architectural) registers are encountered in stream of instructions being executed, physical registers 440 are assigned to represent them. The physical registers 440 may include Single Instruction Multiple Data (SIMD) register banks 442 and General Purpose (GP) register banks 444, which can be much larger in size than the number of logical registers available on the particular CPU architecture, and as a result the performance can be considerably increased. After register renaming 434 is performed, instructions are typically placed in scheduling queues 436, from which a number of instructions may be selected each cycle (based on dependencies) for execution by execution units 450.

The execution units 450 typically include SIMD pipes 452 that perform a number of parallel operations on multiple data fields contained in 128-bit or wider SIMD registers contained in the SIMD register bank 442, arithmetic and logic units (ALUs) 454 that perform a number of logical, arithmetic, and miscellaneous operations on GPRs contained in the GP register bank 444, and address generation units (AGUs) 456 that calculate the address from which memory should be stored or loaded. There may be multiple instances of each type of execution unit, and the instances may have differing capabilities, for example a specific SIMD pipe 452 may be able to perform floating point multiply operations but not floating point add operations. The Target System may include processor units which are incompatible with the Host CPU 400, for Example Vector Processing units or Synergistic Processing Units which will have their functions remapped for the architecture of the Host CPU core 400 by the JIT compiler during emulation of the target system. The JIT compiler 325 may replace problematic target code blocks involving such target system processor units with alternative host system code, as discussed above.

Stores and loads are typically buffered in a store queue 462 and a load queue 464 so that many memory operations can be performed in parallel. To assist in memory operations, the CPU core 400 usually includes a number of data related caches and data translation lookaside buffers (DTLBs) 470. A DTLB cache hierarchy 472 caches virtual address to physical address translation such as page table entries, page directory entries, and the like; this information is used to transform the virtual address of the memory operation into a physical address so that data can be stored or loaded from system memory. The data is typically cached in a level 1 data cache (L1 D-Cache) 474 residing in the core, as well as other cache levels 476 external to the core 400.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In emulation of a target system on a host system in which one or more components of the target system are emulated by translation of target system code written for the target system into corresponding host system code that is executable by the host system, a method for handling problematic target code blocks, the method comprising:
    a) evaluating the target system code for a problematic target code block;
    b) bypassing translation of the problematic target code block;
    c) translating non-problematic portions of the target system code into corresponding portions of host system code with the host system; and
    d) inserting the corresponding portions of host system code into an execution stream containing host system code to be executed by the host system.

2. The method of claim 1, wherein bypassing translation of the problematic target code block includes selecting alternative host code for the problematic target code block and inserting the alternative host code into the execution stream.

3. The method of claim 2 wherein the alternative host code remaps a registry from a registry layout of the target system to a registry layout of the host system.

4. The method of claim 3 wherein the host system has a smaller register than the target system.

5. The method of claim 1, wherein evaluating the target system code includes evaluating one or more target system code blocks for redundant or unnecessary operations with a target system code block.

6. The method of claim 1, wherein evaluating the target system code includes evaluating one or more target system code blocks for inefficiently translatable vector unit code within a target system code block.

7. The method of claim 1 wherein inserting the alternative host code is performed after the target system code has been translated.

8. The method of claim 7 wherein said evaluating the target system code includes placing reference pointers at problematic system code blocks and the reference pointers and problematic target code blocks are replaced with alternative host code after said translating non-problematic portions of the target system code into corresponding portions of host system code with the host system.

9. The method of claim 1 wherein evaluating the target system code for a problematic target code block includes translating the target system code until a suboptimal performance is detected.

10. The method of claim 1 further comprising sending the corresponding portions of host system code and the alternative host code in the execution stream over a network to the host system.

11. The method of claim 1, further comprising executing the corresponding portions of host system code and the alternative host code in the execution stream with the host system.

12. The method of claim 1, wherein evaluating the target code for a problematic code block includes using a host system configured to learn which code blocks are problematic.

13. The method of claim 1, wherein evaluating the target code for a problematic code block includes detecting a specific sequence of memory accesses in the target code that qualify as a problematic target code block.

14. A non-transitory computer-readable medium containing executable instructions that when executed cause a computer system to implement method for handling problematic target code when translating target system code written for the target system into corresponding host system code that is executable by a host system, the method comprising:
    a) evaluating the target system code for a problematic target code block;
    b) bypassing translation of the problematic target code block;

c) translating non-problematic portions of the target system code into corresponding portions of host system code with the host system; and d) inserting the corresponding portions of host system code into an execution stream containing host system code to be executed by the host system.

15. The non-transitory computer-readable medium of claim 14, wherein bypassing translation of the problematic target code block includes selecting alternative host code for the problematic target code block and inserting the alternative host code into the execution stream.

16. The non-transitory computer-readable medium of claim 15 wherein the alternative host code remaps a registry from a registry layout of the target system to a registry layout of the host system.

17. The non-transitory computer-readable medium of claim 16 wherein the host system has a smaller register than the target system.

18. The non-transitory computer-readable medium of claim 14, wherein evaluating the target system code includes evaluating one or more target system code blocks for redundant or unnecessary operations with a target system code block.

19. The non-transitory computer-readable medium of claim 14, wherein evaluating the target system code includes evaluating one or more target system code blocks for inefficiently translatable vector unit code within a target system code block.

20. The non-transitory computer-readable medium of claim 14 wherein inserting the alternative host code is performed after the target system code has been translated.

21. The non-transitory computer-readable medium of claim 20 wherein said evaluating the target system code includes placing reference pointers at problematic system code blocks and the reference pointers and problematic target code blocks are replaced with alternative host code after said translating non-problematic portions of the target system code into corresponding portions of host system code with the host system.

22. The non-transitory computer-readable medium of claim 14 wherein evaluating the target system code for a problematic target code block includes translating the target system code until a suboptimal performance is detected.

23. The non-transitory computer-readable medium of claim 14, wherein the method further comprises sending the corresponding portions of host system code and the alternative host code in the execution stream over a network to the host system.

24. The non-transitory computer-readable medium of claim 14, wherein the method further comprises executing the corresponding portions of host system code and the alternative host code in the execution stream with the host system.

25. The non-transitory computer-readable medium of claim 14, wherein evaluating the target code for a problematic code block includes using a host system configured to learn which code blocks are problematic.

26. The non-transitory computer-readable medium of claim 14, wherein evaluating the target code for a problematic code block includes detecting a specific sequence of memory accesses in the target code that qualify as a problematic target code block.

27. A computer system comprising;
one or more system processors;
a memory coupled to the one or more system processors;
a set of processor executable instructions embodied in the memory, the instructions being configured to cause the computer system to implement a method for handling problematic target code when translating target code written for the target system into corresponding host system code that is executable by a host system, the method comprising:

a) evaluating the target system code for a problematic target code block;

b) bypassing translation of the problematic target code block;

c) translating non-problematic portions of the target system code into corresponding portions of host system code with the host system; and d) inserting the corresponding portions of host system code into an execution stream containing host system code to be executed by the host system.

28. The system of claim 27, wherein bypassing translation of the problematic target code block includes selecting alternative host code for the problematic target code block and inserting the alternative host code into the execution stream.

29. The system of claim 28 wherein the alternative host code remaps a registry from a registry layout of the target system to a registry layout of the host system.

30. The system of claim 29 wherein the host system has a smaller register than the target system.

31. The system of claim 27, wherein evaluating the target system code includes evaluating one or more target system code blocks for redundant or unnecessary operations with a target system code block.

32. The system of claim 27, wherein evaluating the target system code includes evaluating one or more target system code blocks for inefficiently translatable vector unit code within a target system code block.

33. The system of claim 27 wherein inserting the alternative host code is performed after the target system code has been translated.

34. The system of claim 33 wherein said evaluating the target system code includes placing reference pointers at problematic system code blocks and the reference pointers and problematic target code blocks are replaced with alternative host code after said translating non-problematic portions of the target system code into corresponding portions of host system code with the host system.

35. The system of claim 27 wherein evaluating the target system code for a problematic target code block includes translating the target system code until a suboptimal performance is detected.

36. The system of claim 27, wherein the method further comprises sending the corresponding portions of host system code and the alternative host code in the execution stream over a network to the host system.

37. The system of claim 27, wherein the method further comprises executing the corresponding portions of host system code and the alternative host code in the execution stream with the host system.

38. The system of claim 27, wherein the host system is configured to learn which code blocks are problematic.

39. The system of claim 27, wherein evaluating the target code for a problematic code block includes detecting a specific sequence of memory accesses in the target code that qualify as a problematic target code block.

* * * * *